(12) United States Patent
Chen et al.

(10) Patent No.: US 7,082,501 B2
(45) Date of Patent: Jul. 25, 2006

(54) REMOTE NODE ACCESSING LOCAL MEMORY BY USING DISTRIBUTED SHARED MEMORY

(75) Inventors: Wei-Long Chen, Rochester, MN (US); Jiin Lai, Shindian (TW); Wayne Tseng, Shindian (TW)

(73) Assignee: Via Technologies, Inc., Shindian (TW)

( * ) Notice: Subject to any disclaimer, the term of this patent is extended or adjusted under 35 U.S.C. 154(b) by 314 days.

(21) Appl. No.: 10/405,571

(22) Filed: Apr. 2, 2003

(65) Prior Publication Data

US 2003/0191905 A1    Oct. 9, 2003

Related U.S. Application Data

(60) Provisional application No. 60/371,194, filed on Apr. 9, 2002.

(30) Foreign Application Priority Data

Jun. 17, 2002    (TW) ............................... 91113128 A

(51) Int. Cl.
*G06F 12/00* (2006.01)

(52) U.S. Cl. ........................ 711/141; 711/144; 711/145; 711/146

(58) Field of Classification Search ........ 711/141–147; 709/213
See application file for complete search history.

(56) References Cited

U.S. PATENT DOCUMENTS

| | | | |
|---|---|---|---|
| 6,014,690 A | 1/2000 | VanDoren et al. | 709/215 |
| 6,018,791 A * | 1/2000 | Arimilli et al. | 711/141 |
| 6,044,438 A * | 3/2000 | Olnowich | 711/130 |
| 6,438,659 B1 * | 8/2002 | Bauman et al. | 711/141 |
| 6,633,960 B1 * | 10/2003 | Kessler et al. | 711/144 |
| 6,654,866 B1 | 11/2003 | Hagersten et al. | 211/205 |
| 6,751,698 B1 | 6/2004 | Deneroff et al. | 710/317 |
| 6,857,051 B1 * | 2/2005 | Sharma et al. | 711/145 |
| 6,877,030 B1 * | 4/2005 | Deneroff | 709/213 |

FOREIGN PATENT DOCUMENTS

EP  0936558  12/1999
WO  WO 01/67273 A2  3/2001

* cited by examiner

*Primary Examiner*—T Nguyen
(74) *Attorney, Agent, or Firm*—Volpe and Koenig, P.C.

(57) ABSTRACT

A DSM system includes a local node, a first remote node, and a second remote nodes. The data access method for a remote node to access a local node in the DSM system includes the steps of directly receiving data of a local memory line from a local memory of the local node, and transmitting the data to the first remote node when the local memory line is in HOME-N or SHARED status; directly receiving data of the local memory line from the second remote node, and transmitting the data to the first remote node when the local memory line is in a GONE status; and asserting a transaction to a system bus to read data of the local memory line, receiving the data via the system bus, and transmitting the data to the first remote node when the local memory line is in HOME-M status.

8 Claims, 4 Drawing Sheets

REMOTE NODE ACCESSING LOCAL MEMORY BY USING DISTRIBUTED SHARED MEMORY

FIELD OF THE INVENTION

The present invention relates to a distributed shared memory (DSM) architecture in a multi-processor system, and more particular to a distributed shared memory architecture in which a remote node accesses a local memory by using the distributed shared memory system. The present invention also relates to a DSM system utilizing the data access algorithms according to the present invention.

BACKGROUND OF THE INVENTION

Due to the increasing advance of science and technology, digitized information processing means plays a more and more important role on our daily lives and business activities. Consequently, the data processing amount is too huge to be operated by using a simple data processing device, such as a computer system with a single processor and a local memory. In order to efficiently deal with a large quantity of data, a processing system involving a distributed shared memory (DSM) is developed for parallel data-processing and rapid data-sharing purpose for a remote node to access a local memory.

Please refer to FIG. 1, which is a schematic block diagram of a multi-processor computer architecture having a distributed shared memory (DSM). For example, a computer system with one or more processors can be considered as a DSM node. As shown in FIG. 1, the computer system is a multiprocessor computer architecture. In general, the computer system with a single processor can be consider as a DSM node, too. Processors 110 and 120 included in the DSM node are electrically connected to a memory control chip 130 via a system bus 160. By way of the memory control chip 130, the access operations between the processors 110, the processor 120 and a local memory 150 is controlled. The memory control chip 130 could be further electrically connected to other devices for basic input/output control and the task of the memory control chip 130 is executed by a north-bridge chip in a computer system.

The local memory 150 is divided into a plurality of local memory lines for storing data. When necessary, the processor 110 or 120 asserts a data access request to the memory control chip 130, thereby accessing data stored in the local memory lines via the memory control chip 130.

In a DSM system architecture, the data accessing/transferring communication among DSM nodes is controlled by DSM controllers. As shown in FIG. 1, the local DSM node 100 transmits/receives data to/from a remote DSM node via a DSM controller 140. The DSM controller 140 is electrically connected to the system bus 160 and to the memory control chip 130 via an internal bus 135.

As the processor 110 or 120 of the local node 100 accesses data stored in a memory line of a remote node, the DSM controller 140 communicates with the DSM controller (not shown) of the remote node to access data therein.

Since each node must shares its own memory lines with other nodes, a memory coherency directory is required for each node. The status of each memory line in a node is recorded in the memory coherency directory. When a remote node is going to access the local memory 150 in the local node 100, the memory coherency directory in the node 100 must be referred to check the status of the local memory 150 to decide how to access it by the remote node in order to make sure that the data accessed by the remote node is right.

Please refer to FIG. 2, which is a schematic diagram showing various status of a local memory line, including HOME, SHARED, GONE and WASH. The four kinds of status are described as follows.

HOME: The local memory is not accessed by any remote node.

SHARED: The local memory was accessed by a remote node and the data in the local memory line is not revised by the remote node.

GONE: The local memory was accessed by a remote node and the data in the local memory line was revised by the remote node.

WASH: The data in the local memory was revised by a remote node and was transmitted to the local node.

The data revision procedures in the local memory line in response to the status will be described hereinafter. The initial status of the local memory line in the memory coherency directory is supposed to be HOME status. In HOME status, the processors in the local node can freely access data from the local memory line, and the data is exclusively stored in the local node. When a remote node asserts a "remote read line" command in HOME status of the local node, it indicates the remote node is going to read data from the local memory line. At meantime, the data in the local memory line is transmitted to the remote node. Accordingly, the memory status of the local memory line in the memory coherency directory will be changed from HOME to SHARED, as shown in path "1" of FIG. 2. Meanwhile, as the status of the local memory line is recorded in the memory coherency directory as SHARED status, the data in the local memory line is also stored in the remote node.

In SHARED status, when the local node asserts a "local read invalidate" or "local invalidate" signal, it indicates that the local node is going to revise the data in the local memory line. Therefore, the memory status of the local memory line in the memory coherency directory will change from SHARED to HOME, as shown as path "2", in order that the processor(s) of the local node can freely access the data in the local memory line. Thus the data previously stored in the remote node will be out of date and invalidated.

In another case, when a remote node asserts a "remote rollout of shared copy" signal in SHARED status, it indicates the remote node abandons the data in the local memory copy. Under this circumstance, the memory status of the local memory line in the memory coherency directory also changes from SHARED to HOME, as shown as path "4".

In further another case, when a remote node asserts a "remote invalidate" signal, it indicates the remote node is going to revise the data in the local memory line. Thus, the memory status of the local memory line in the memory coherency directory will change from SHARED to GONE, as shown as path "7". GONE status indicates that the data in the local memory line is out of date, and the updated data supposed to be stored in the local memory line is stored in the remote node.

On the other hand, as shown as path "6", when a remote node asserts a "remote read invalidate" signal in HOME status, it indicates that the remote node is going to read and revise the data in the local memory line, and the memory status of the local memory line in the memory coherency directory will change from HOME to GONE.

According to GONE status, when a remote node asserts a "remote rollout of modified copy" signal, it indicates that the remote node is going to release the revised data to the local memory line. The memory status of the local memory line in the memory coherency directory will change from GONE to HOME, as shown as path "8". In other words, the revised data returns the local node.

Further, when the local node asserts a "local read line" or "local read invalidate" signal, it indicates that the local node is going to read the data in the local memory line and optionally revise the data after reading. Meanwhile, the memory status of the local memory line in the memory coherency directory will change from GONE to WASH, as shown as path "5". According to WASH status, a transition state is indicated as that the data of the local memory line is being transferred from a remote node back to the local node.

Under WASH status, when the local node asserts a "completion of local read line" signal, it indicates that the local node is going to read rather than revise the data in the local memory line. At this moment, the memory status of the local memory line in the memory coherency directory will change from WASH to SHARED, as shown as path "9". Then the data in the local memory line is allowed to be stored in both the local node and a remote node.

On the other hand, when the local node asserts a "completion of local read invalidate" signal, it indicates that the local node is going to read and revise the data in the local memory line. The memory status of the local memory line in the memory coherency directory will change from WASH to HOME, as shown as path "10", to store the data only in the local node.

According to the above description, it is understood that the reading operations of a remote node can be coordinated according to the memory coherency directory which records therein the status of the local memory lines. The DSM controller of each node must maintain a memory coherency directory and the status recorded therein according to each memory line. As a remote node access the local memory line in the local node, the memory status of the memory line according to the memory coherency directory must be checked for deciding how to access the memory line in order to make sure that right data is accessed by the remote node.

Please refer to FIG. 1 again. When a remote node is going to read data in the local memory line, the DSM controller 140 in the local node 100 will assert a "system bus transaction" signal to realize the position of the data in the local memory line.

If the data is stored in the cache memory of the processor 110 or 120, the processor 110 or 120 will assert "hit" command to transmit the data to the system bus 160, and write the data back to the local memory 150 via the memory control chip 130. Meanwhile, the DSM controller 140 receives the data in the local memory line via the system bus 160, and transmits the data to a remote node. The current status of the local memory line defined in the memory coherency directory is the SHARED status.

If the data is stored in the local memory 150, the processor 110 or 120 will not assert "hit" command. Under this circumstance, the DSM controller 140 will request the memory control chip 130 to transmit thereto the data in the local memory line via the internal bus 135, and then transmit the data to a remote node. The current status of the local memory line defined in the memory coherency directory is SHARED status.

When a remote node requests to read data from the local memory line in HOME status, the position of the data in the local memory line cannot be acquired by the remote node. For example, the data may be stored in the local memory or cache memory or both. Therefore, the DSM controller 140 has to assert the "system bus transaction" command to realize the position of the data in the local memory line. Even in the case that the data has been stored in the local memory, the DSM controller 140 still needs to assert the "system bus transaction" command to inquire the position of the data in the local memory line. Therefore, a heavy burden is added to the system bus 160, and the time period required to read data from the local memory line is prolonged.

SUMMARY OF THE INVENTION

Therefore, an object of the present invention is to provide a data access method for use in a DSM system which needs not to redundantly assert the "system bus transaction" command to inquire the position of the data in the local memory line when the data has been stored in the local memory.

A first aspect of the present invention relates to a data access method for use in a distributed shared memory (DSM) system. The DSM system comprises a local node and a remote node. The method comprises the steps of: determining whether a latest data of a local memory line is stored in a local memory of the local node in response to a request from the remote node in order to read the latest data of the local memory line; and obtaining the latest data via an internal bus and transmitting the latest data to the remote node when the latest data is stored in the local memory.

In an embodiment, the data access method further comprises the steps of: determining whether the latest data is stored in the local node if the latest data has been determined to be not stored in the local memory; and asserting a system bus transaction to obtain the latest data via a system bus and transmitting the latest data to the remote node when the latest data is determined to be in the local node.

Preferably, whether the latest data is stored in the local memory or not is determined according to a memory coherency directory. The memory coherency directory defines HOME-M, HOME-N, SHARED, GONE and WASH status of the local memory line, and HOME-N and HOME-M status indicate the presence and absence of the latest data in the local memory, respectively.

A second aspect of the present invention relates to a data access method for use in a distributed shared memory (DSM) system. The DSM system comprises a local node, a first remote node, and a second remote nodes. The method comprises the steps of: directly receiving data of a local memory line from a local memory of the local node, and transmitting the data to the first remote node when the local memory line is in HOME-N or SHARED status; directly receiving data of the local memory line from the second remote node, and transmitting the data to the first remote node when the local memory line is in GONE status; and asserting a transaction to a system bus to read data of the local memory line, receiving the data via the system bus, and transmitting the data to the first remote node when the local memory line is in HOME-M status.

In an embodiment, HOME-N, HOME-M, SHARED, WASH and GONE status are stored in a memory coherency directory.

A third aspect of the present invention relates to a distributed shared memory (DSM) system, which comprises at least one processor; a system bus coupled to the at least one processor; a memory control chip coupled to the system bus; a local memory coupled to the memory control chip, and divided into a plurality of local memory lines for storing a plurality of data; a DSM controller coupled to the system bus; an internal bus coupled to the DSM controller and the memory control chip. In response to a request to read a latest data in a specified one of the local memory lines, the DSM controller determines whether the latest data is stored in the local memory, and transfers the latest data via the internal bus if the latest data is stored in the local memory.

In an embodiment, the DSM controller asserts a system bus transaction to request the latest data if the latest data is not in the local memory but in the processor.

Preferably, the DSM controller determines a position of the latest data according to a memory coherency directory.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is noted that the following descriptions of preferred embodiments of this invention are presented herein for purpose of illustration and description only; it is not intended to be exhaustive or to be limited to the precise form disclosed.

Figure 1:
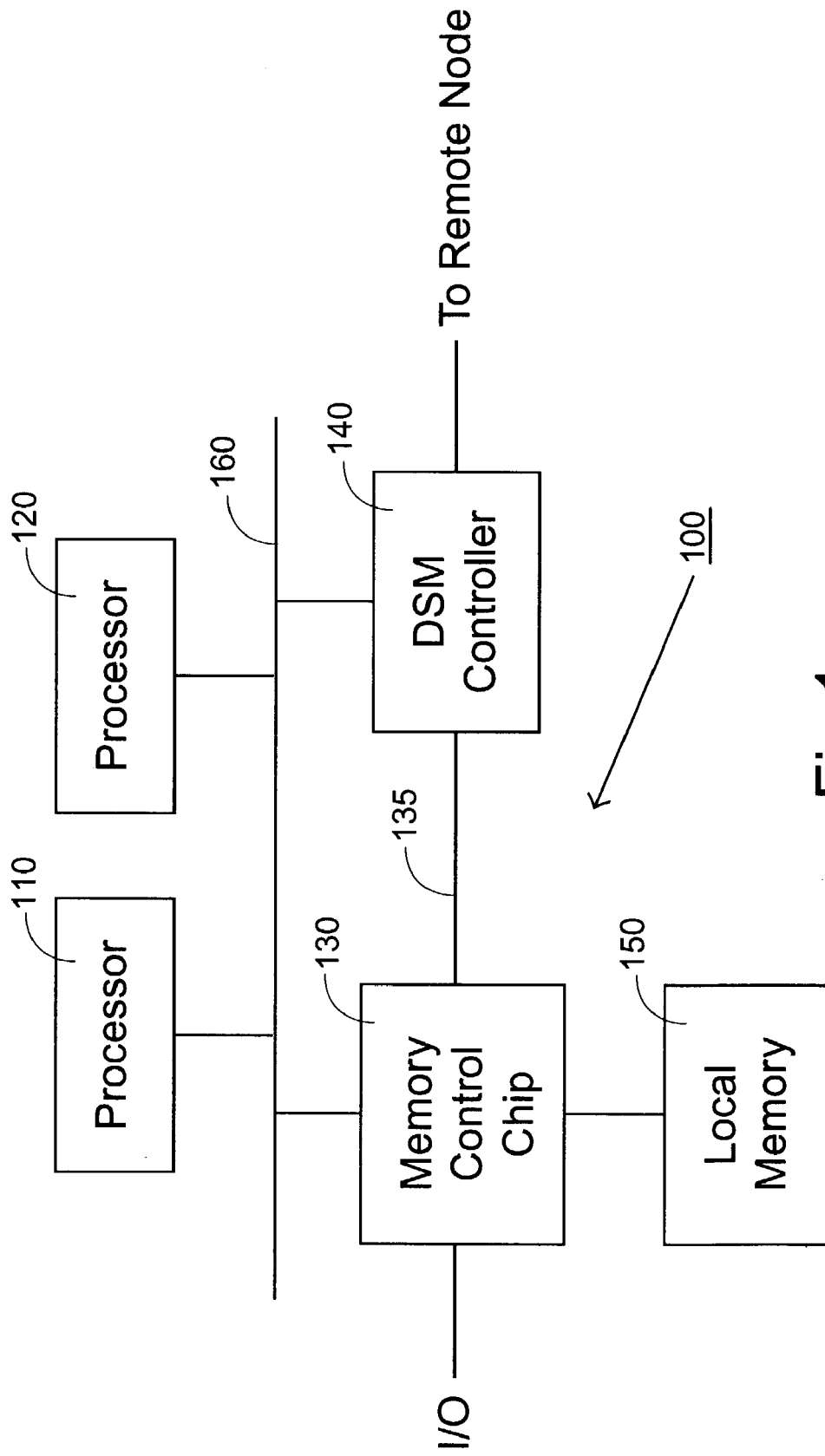
FIG. 1 is a schematic circuit block diagram showing a distributed shared memory (DSM) structure.
Figure 2:
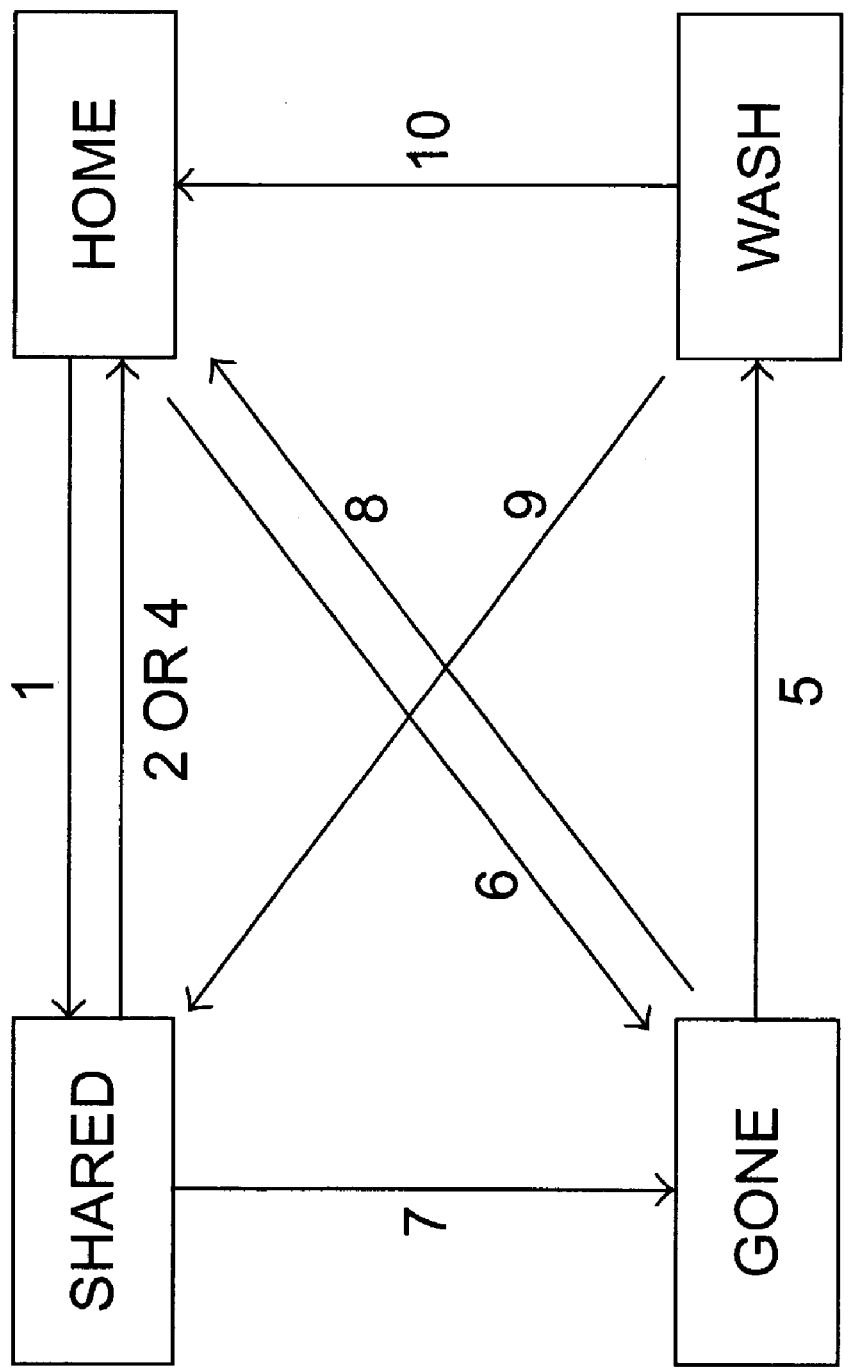
FIG. 2 is a schematic diagram showing various status of a local memory line, including HOME, SHARED, GONE and WASH.
Figure 3:
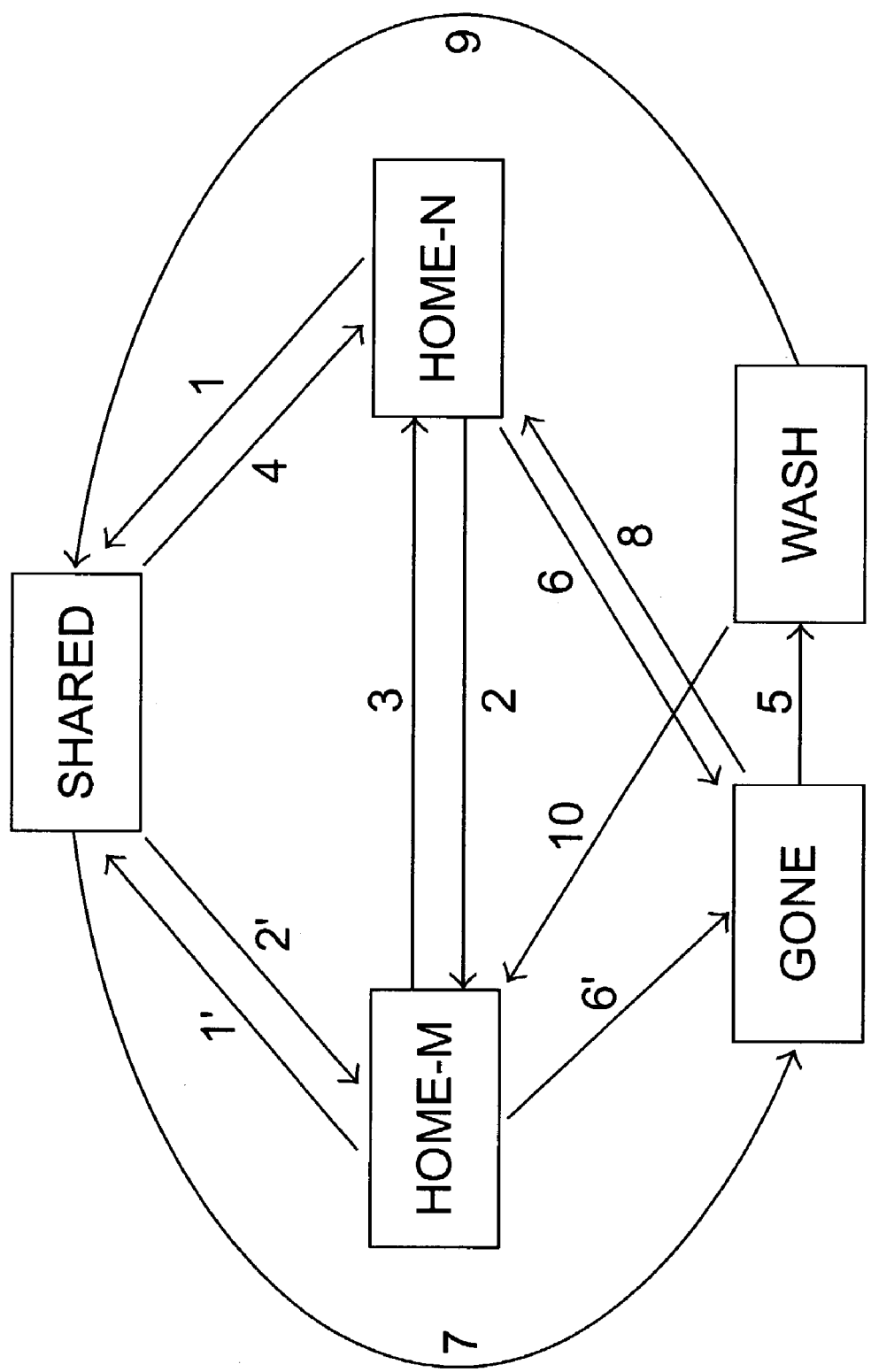
FIG. 3 is a schematic diagram showing various status of a local memory line, including HOME-M, HOME-N, SHARED, GONE and WASH.

The DSM node as shown in FIG. 1 is used for illustrating an embodiment of the present invention. The status of the local memory line indicated by a memory coherency directory, however, are modified to solve the problems encountered by the prior art. Please refer to FIG. 3 which is a schematic diagram showing various status of a local memory line. In an embodiment of the present invention, the status of a local memory line indicated by a memory coherency directory including HOME-M, HOME-N, SHARED, GONE and WASH, wherein the meanings of the SHARED, GONE and WASH status are similar to the above-mentioned prior art DSM node system, and the meanings of HOME-M and HOME-N are:

HOME-N: The data from the local memory line is not read by any remote node, and the latest data in a local memory line is stored in the local memory; and HOME-M: The data from the local memory line is not read by any remote node, and the latest data in a local memory line is not stored in the local memory, but in the cache memory of a processor.

Hereinafter, the switching of the status according to the transmitting of the data in a local node are described. The initial status of the local memory line in the memory coherency directory is HOME-N status. In HOME-N status, the latest data is stored in the local memory 150 of the local node 100. When a remote node asserts a "remote read line" command, it indicates a remote node is going to read data from the local memory line. Accordingly, the memory status of the local memory line in the memory coherency directory will be changed from HOME-N to SHARED, as shown as path "1" in FIG. 3. Under HOME-N status, the DSM controller 140 of the local node requests the memory control chip 130 via the internal bus 135 to transmit the data in the local memory line to the remote node. Accordingly, the DSM controller 140 does not assert a system bus transaction for the transmittance of the data from the local node to the remote node. SHARED status indicates that the data in the local memory line is stored in both of the local and the remote nodes.

Alternatively, when the local node asserts a "local read invalidate" or "local invalidate" command, it indicates that the local node is going to revise the data in the local memory line. Therefore, the memory status of the local memory line in the memory coherency directory will be changed from HOME-N to HOME-M, as shown as path "2" in FIG. 3. HOME-M status indicates that the processor 110 or 120 of the local node 100 can revise the data in the local memory line, and store the data in the cache memory in the local node 100.

Further, as shown as path "6", when a remote node asserts a "remote read invalidate" command in HOME-N status, it indicates that the remote node is going to read and revise the data in the local memory line, and the memory status of the local memory line in the memory coherency directory will be changed from HOME-N to GONE. GONE status indicates that the data in the local memory line is out of date, and the updated data is stored in the remote node.

In HOME-N status, since the DSM controller 140 can directly request the data in the local memory line from the memory control chip 130 via the internal bus 135 and transfer the data to the remote node, the DSM controller 140 is not necessary to assert any "system bus transaction" command.

In HOME-M status, when a remote node asserts a "remote read line" command, it indicates the remote node is going to read data from the local memory line. Accordingly, the memory status of the local memory line in the memory coherency directory will be changed from HOME-M to SHARED, as shown as path "1'." in FIG. 3. SHARED status indicates that the data in the local memory line is stored in both of the local and the remote nodes. Under Home-M status, the DSM controller 140 must assert a system bus transaction to request the processor 110 or 120 to send "HIT" command to provide the latest data of the local memory line to the system bus 160 and the latest data will be stored in the local memory 150. Meanwhile, the DSM controller 140 will receive the latest data from the system bus 160 and transmit it to the remote node.

Alternatively, when a remote node asserts a "remote read invalidate" command under HOME-M status about the local memory 150, it indicates that the remote node is going to read and revise the data in the local memory line, and the memory status of the local memory line in the memory coherency directory will be changed from HOME-M to GONE, as shown as path "6'". GONE status indicates that the data in the local memory line is out of date, and the updated data is stored in the remote node.

In HOME-M status, the DSM controller 140 has the processor to assert a "hit" command and provide therefor the latest data in the local memory line by asserting a "system bus transaction" command, and transfer the latest data to the remote node to be revised.

Further, when the local node asserts a "local read line" command, it indicates that the data in the local memory line is going to be written back into the local memory 150 from the cache memory. Therefore, the memory status of the local memory line in the memory coherency directory will be changed from HOME-M to HOME-N, as shown as path "3" in FIG. 3. HOME-N status indicates that the local memory 150 owns the newest data of the local memory line.

In SHARED status, when the local node asserts a "local read invalidate" or "local invalidate" command, it indicates that the local node is going to revise the data in the local memory line. Therefore, the memory status of the local memory line in the memory coherency directory will be changed from SHARED to HOME-M, as shown as path "2'" in FIG. 3. HOME-M status indicates that the processor 110 or 120 of the local node 100 can revise the data in the local memory line, and store the data in the cache memory in the local node 100.

Alternatively, when a remote node asserts a "remote rollout of shared copy" command in SHARED status, it indicates the remote node abandons the data in the local memory 150. Under this circumstance, the memory status of the local memory line in the memory coherency directory is also changed from SHARED to HOME-N status, as shown as path "4" in FIG. 3, so that the data in the local memory line is stored in the local memory 150 of the local node 100.

In further another case, when a remote node asserts a "remote invalidate" command, it indicates the remote node is going to revise the data in the local memory line. Thus, the memory status of the local memory line in the memory coherency directory will be changed from SHARED to GONE, as shown as path "7" in FIG. 3. The GONE status indicates that the data in the local memory line is out of date, and the updated data supposed to be stored in the local memory line is stored in the remote node.

According to GONE status, when a remote node asserts a "remote rollout of modified copy" command, it indicates that the remote node is going to release the revised data back to the local node. The memory status of the local memory line in the memory coherency directory will be changed from GONE to HOME-N, as shown as path "8" in FIG. 3. In other words, the revised data returns the local memory 150 of the local node 100.

Further, when the local node asserts a "local read line" or "local read invalidate" command, it indicates that the local node is going to read the data in the local memory line and optionally, revise the data. Meanwhile, the memory status of the local memory line in the memory coherency directory will be changed from GONE to WASH, as shown as path "5" in FIG. 3. WASH status indicates a transition state that the data of the local memory line is being transferred from a remote node back to the local node 100.

In WASH status, when the local node asserts a "completion of local read line" command, it indicates that the local node is going to read rather than revise the data in the local memory line. At this moment, the memory status of the local memory line in the memory coherency directory will be changed from WASH to SHARED, as shown as path "9" in FIG. 3. Then, the data in the local memory line is allowed to be stored in both the local node 100 and a remote node.

On the other hand, when the local node asserts a "completion of local read invalidate" command, it indicates that the local node is going to read and revise the data in the local memory line. The memory status of the local memory line in the memory coherency directory will be changed from WASH to HOME-M, as shown as path "10". HOME-M status indicates that the data in the local memory line is revised by the processor 110 or 120 and stored in the cache memory.

By distinguishing the conventional HOME status according to prior art into HOME-M and HOME-N status according to the invention, the DSM controller 140 may directly request the data of the local memory line in the local memory 150 from the memory control chip 130 via the internal bus 135 when the status of the local memory line is switched from HOME-N to SHARED or GONE status. In other words, no additional "system bus transaction" command is required by the memory control chip 130 to realize the position of the data of the local memory line. Therefore, the frequency to access the system bus by the memory control chip 130 will be reduced so as to improve the performance of the local node 100.

Figure 4:
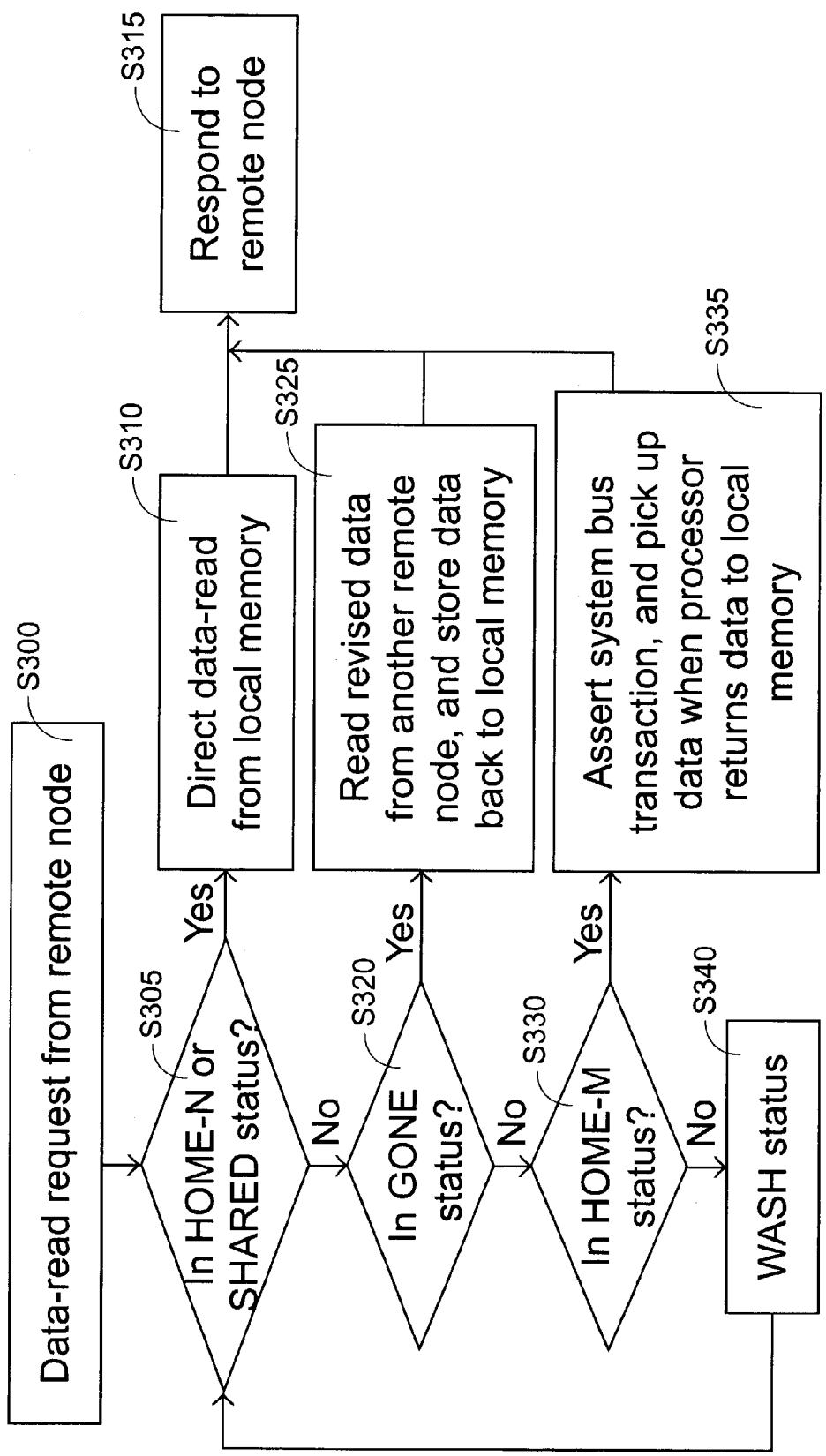
FIG. 4 is a flowchart schematically showing a data access method for a remote node accessing a local node according to an embodiment of the present invention.

In addition to the above description based on the status changes according to the memory coherency directory, the data access method according to an embodiment of the present invention will be described hereinafter with reference to the flowchart of FIG. 4.

After receiving a request to read the data in the local memory line from a remote node (Step S300), the status of the local memory line in the memory coherency directory is specified (Step S305). If the status is in HOME-N or SHARED status, it is indicated that the data of the local memory line is stored in the local memory 150, and can be directly accessed via the internal bus 135 (Step S310). Afterwards, the remote node can be responded thereto with such data in the local memory line (Step S315).

On the contrary, if the local memory line is not in the HOME-N or SHARED status, it is discriminated whether to be in GONE status or not (Step S320). GONE status indicates that the data in the local memory line is stored in another remote node. Therefore, the revised data in the local memory line can be read from the remote node, stored back to the local memory (Step S325), and then used to respond to the remote node asserting the read request (Step S315).

If the current memory status is not GONE status, it is discriminated whether to be in HOME-M status or not (Step S330). HOME-M status indicates that the data in the local memory line is stored in the cache memory of the processor, and thus a "system bus transaction" command is directly asserted. Under this circumstance, the remote node is responded thereto (Step S315) by picking up the data in the local memory line from the local memory after the data is returned to the local memory by the processor (Step S335).

If the current memory status is not HOME-M status, it will be determined to be the WASH status (Step S340). WASH status indicates a transition state that the data of the local memory line is being transferred from a remote node back to the local node. Therefore, the discriminating step S305 and the following steps are executed again.

The data access method according to the present invention takes an advantage of omitting the unnecessary position confirmation step by asserting a "system bus transaction" command, thereby alleviating the burden of the system bus and improving its performance. Further, the present method avoids the undesired delay of a remote node for reading the data from the local memory.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data access method for a remote node to access a latest data from a local node in a distributed shared memory (DSM) system, comprising the steps of:

determining whether a latest data is stored in a local memory when receiving a request from a remote node to read said latest data;

obtaining said latest data from said local memory via an internal bus and transmitting said latest data to said remote node by a DSM controller when said latest data is stored in said local memory; and asserting a system bus transaction to obtain said latest data via a system bus and transmitting said latest data to said remote node via said DSM controller, when said latest data is not stored in said local memory but still in said local node.

2. The method according to claim 1, wherein whether said latest data is stored in said local memory or not is determined according to a memory coherency directory.

3. The method according to claim 2, wherein said memory coherency directory defines HOME-M, HOME-N, SHARED, GONE and WASH status of said local memory line, and said HOME-N and HOME-M status indicate the presence and absence of said latest data in said local memory, respectively.

4. A data access method for use in a distributed shared memory (DSM:) system, said DSM system comprising a plurality of nodes, each node comprising at least one processor, a system bus coupled to said at least one processor, a memory control chip coupled to said system bus, a system memory coupled to said memory control chip and divided into a plurality of local, memory lines for storing a plurality of data, a DSM controller coupled to said system bus, an internal bus coupled to said DSM controller and said memory control chip, said method comprising:

directly receiving data of a local memory line from a local memory of a local node, and transmitting said data to a first remote node, when said local memory line is in HOME-N or SHARED status;

directly receiving data of said local memory line from a second remote node, and transmitting said data to said first remote node when said local memory line is in GONE status; and asserting a transaction to a system bus to read data of said local memory line, receiving said data from said at least one processor via said system bus, and transmitting said data to said first remote node, when said local memory line is in HOME-M status, wherein said HOME-N. HOME-M. SHARED and GONE status of said plurality of local memory lines are stored in a memory coherency directory.

5. A distributed shared memory (DSM) system comprising a local node and a remote node, said local node comprising:

at least one processor;
a system bus coupled to said at least one processor;
a memory control chip coupled to said system bus;
a local memory coupled to said memory control chip, and divided into a plurality of local memory lines for storing a plurality of data;
a DSM controller coupled to said system bus;
an internal bus coupled to said DSM controller and said memory control chip, wherein in response to a request from said remote node to read a latest data in a specified one of said local memory lines of said local node, said DSM controller determines whether said latest data is stored in said local memory, and transfers said latest data from said local memory to said remote node via said internal bus instead of said system bus if said latest data is stored in said local memory.

6. The distributed shared memory system according to claim 5, wherein said DSM controller asserts a system bus transaction to request said latest data if said latest data is not in said local memory but in said processor.

7. The distributed shared memory system according to claim 5, wherein said DSM controller determines a position of said latest data according to a memory coherency directory.

8. The distributed shared memory system according to claim 5, wherein said local memory is a system memory.

* * * * *